United States Patent
Barnhart

[11] 3,934,079
[45] Jan. 20, 1976

[54] BILATERAL COMMUNICATIONS SYSTEM FOR DISTRIBUTING COMMERICAL AND PREMIUM VIDEO SIGNALING ON AN ACCOUNTABLE BASIS

[75] Inventor: Andrew Wayne Barnhart, Dresher, Pa.

[73] Assignee: Jerrold Electronics Corporation, Horsham, Pa.

[22] Filed: Oct. 26, 1973

[21] Appl. No.: 409,820

[52] U.S. Cl. ............ 178/5.1; 178/DIG. 13; 325/31; 325/308
[51] Int. Cl.² .......................................... H04N 1/44
[58] Field of Search ...... 178/5.1, DIG. 13; 325/308, 325/31

[56] References Cited
UNITED STATES PATENTS

| | | | |
|---|---|---|---|
| 3,668,307 | 6/1972 | Face et al. ........................... | 178/5.1 |
| 3,733,430 | 5/1973 | Thompson et al. ................... | 178/5.1 |
| 3,757,225 | 9/1973 | Ulicki ................................. | 178/5.1 |
| 3,777,053 | 12/1973 | Wittig et al. ......................... | 178/5.1 |
| 3,790,700 | 2/1974 | Callais et al. ........................ | 178/5.1 |

*Primary Examiner*—Maynard R. Wilbur
*Assistant Examiner*—S. C. Buczinski
*Attorney, Agent, or Firm*—John M. Calimafde

[57] ABSTRACT

A bilateral communications system, as for CATV application, distributes commercially available and premium video programming on a subscriber demand---directly accountable basis. At least the premium video programming is impressed on the cable in a frequency band and/or format not recoverable by a standard television receiver, absent receipt at a particular subscriber location of a reception-authorizing message from the system head end.

A central processor at the system head end sequentially polls cable subscribers under stored program control, permitting bilateral digital communications between the subscriber and the head end.

29 Claims, 6 Drawing Figures

BILATERAL COMMUNICATIONS SYSTEM FOR DISTRIBUTING COMMERICAL AND PREMIUM VIDEO SIGNALING ON AN ACCOUNTABLE BASIS

DISCLOSURE OF INVENTION

This invention relates to electronic signal distribution systems and, more specifically, to a bilateral signal translating system for distributing commercial and supplementary video programming from a central head end location to plural spaced subscriber stations, and for providing bilateral signaling between the head end and subscriber stations.

Community antenna television (CATV) system operators have for some time been desirous of providing premium video programming (such as first run theater and movies, special sporting events, and the like) to supplement the locally available "off-air" commercial television signals distributed by coaxial cable. Preferably, the premium video is to be distributed on a directly accountable basis — i.e., with separate fees charged for each premium program received at each subscriber station.

Moreover, a projected growth area for the CATV business involves data communications from system subscribers to the head end. Such reverse signaling permits the provision of various commercial services over the cable network — e.g., ordering of identifiable goods and services by subscribers.

However, only limited endeavors into such full service pay-TV as above-described have been employed to date.

It is an object of the present invention to provide improved CATV system signaling apparatus.

More specifically, it is an object of the present invention to provide a CATV system for providing premium video programs on a subscriber demand-directly accountable basis, and wherein provision is made for reverse signaling from subscribers to the system head end.

The above and other objects of the present invention are realized in a specific, illustrative bilateral cable video signaling system wherein computer controlled head end equipment impresses upon the system cable for distribution to all system subscribers plural commercial and premium video programs, and also digital signaling. At least all of the premium video programs are at frequency allocations and/or of formats making them unrecoverable by standard television receivers connected directly to the cable.

Each subscriber station includes electronic terminal equipment connected to the cable, comprising a terminal control unit for establishing bilateral serial digital signaling with the head end responsive to address and command words issued to the cable by the head end. The subscriber terminal includes loop-connected subscriber controller, channel selecting and channel control modules which cooperate with head end produced reception authorization commands for providing to a subscriber a selected premium (or commercial) video program in a format recoverable by a standard receiver. A subscriber actuated controller keyboard includes command and data keys for transmitting information to the system head end — possibly totally unrelated to video reception, as to order goods or services; respond to polling requests; or the like.

In accordance with one aspect of the present invention, a subscriber location may include one or more additional head end controlled peripheral items, e.g., additional television receivers; security devices; printers or recorders and so forth.

The above and other features and advantages of the present invention will become more clear from the following detailed description of a specific illustrative embodiment thereof, considered below in conjunction with the accompanying drawing, in which:

FIG. 6 depicts the spacial arrangement of FIGS. 1–5. All structural elements depicted in FIGS. 1–5 and discussed below are identified by three reference numerals, the first of which identifies the particular figure on which that element may be found.

Referring now to FIGS. 1–5, there is shown a specific, illustrative bilateral signaling system wherein common, head end equipment (FIG. 5) communicates via a coaxial cable network 500 with a plurality of subscriber stations. One such station is shown in detail in FIGS. 1–4.

Figure 1:
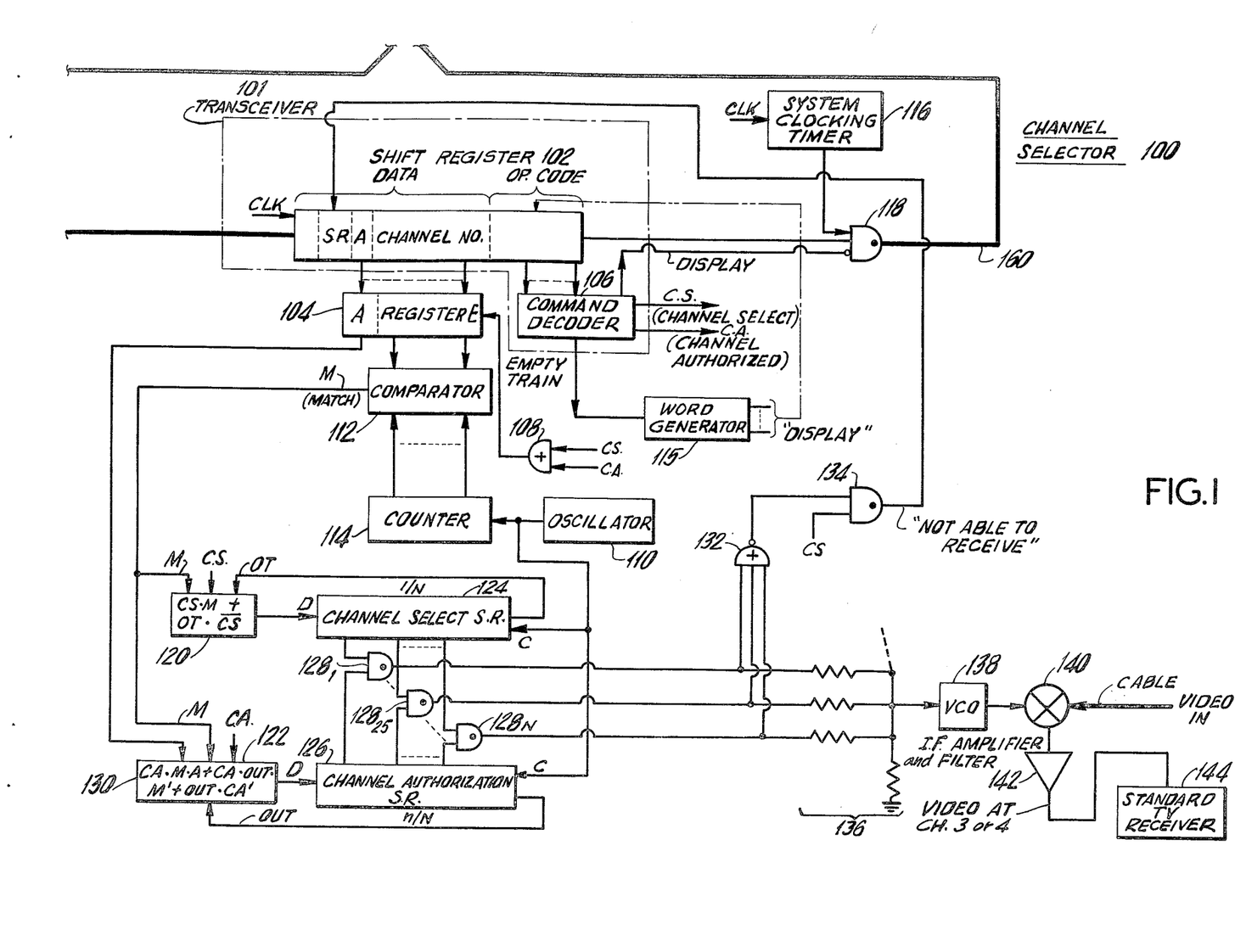
FIGS. 1–5 schematically depict a composite bilateral signaling system employing the principles of the present invention.

A standard television receiver 144 at the subscriber location is connected to the cable via a mixer 140 and IF amplifier and filter 142, the local oscillation for the mixer 140 being supplied by a voltage controlled oscillator 138. The video signals impressed on the cable via the head end equipment comprise locally available commercial "off-air" programs, and a plurality of premium, private programs. At least the private programs are impressed on the cable 500 in a frequency band which does not correspond to any of the standard broadcast channels, and thus cannot be received by a standard receiver connected to the cable. For purposes of concreteness here, it will be assumed that all of the video channels do not correspond in frequencies to standard channel allocations. In a manner discussed below, each such video signal is selected for viewing by supplying a proper control voltage to the voltage controlled oscillator 138 such that the heterodyning mixer-amplifier 140–142 converts the desired signal to a preselected channel for the standard receiver, e.g., to a locally unused one of channels 3 or 4.

To a substantial measure, much of the discussion below will consider the particular manner in which a subscriber requests (electronically) that he be permitted to view a program, and the manner in which an authorization command is issued by the head end equipment to permit that reception. Then also, discussion will be had regarding other digital bilateral communications between the subscribers and the head end.

By way of general overview, the equipment at the subscriber station includes a subscriber control module 200 for developing and entering viewing requests (i.e., channel selection) and information to be transmitted to the head end; a channel selector module 100 for implementing reception of a television signal requested for viewing by the subscriber at the control module 200 and authorized by the head end; and a channel control module 300 which acts as an interface for communications between the subscriber station and the head end. Any one of the modules 100, 200 or 300 can generate messages (in general formed of an operation code [command portion] and a data portion) which circulate between the modules 100, 300, 200 via serial data links 160, 260 and 249, respectively. Where information is to be transmitted from the head end to the subscriber equipment, it is transmitted via the cable 500 and a subscriber terminal control module 400 (FIG. 4) to the channel control unit 300 from which it is circulated to the modules 200 and 100. Similarly, where information is to be transmitted from the subscriber equipment to the head end, it is circulated by the modules 200 and 100 for loading into appropriate registers in the channel control module 300 — whereupon it flows outward via the terminal control unit 400 and cable 500 to the head end.

The particular way in which television reception is implemented will now be considered, reference being made to FIG. 1. Assume that a subscriber wishes to watch a particular channel (designated by an arbitrary number such as 25). He depresses a "channel select" control key 202 at his hand-set keyboard unit 201, also depressing the particular data character keys 2 and 5. By FIG. 2 structure considered below, a message is formed comprising a channel select operation code, and the decimal numerals 2 and 5. This message is transmitted from the subscriber control module 200 to a transceiver 101 in the channel selector module 100 and more particularly into a shift register 102 included in the transceiver. At an appropriate time when the message is fully contained in the shift register 102 (determined by system timing in a conventional manner, as by counting system clock pulses, not further considered or shown herein), a command decoder 100 examines the operation code storage portion of the shift register 102. For the particular assumed (channel select) message the command decoder 106 (assumed to be latching, and thus signal preserving) generates a high level "CS" (channel select) signal. The CS signal, identifying that a channel select mode of operation is being effected, is distributed as illustrated in FIG. 1. Among other functions, the CS signal passes through an OR gate 108 to enable a latchregister 104, i.e., to load into the register 104 the data contained in the shift register 102 (the desired channel information 25 for the assumed message).

A digital comparator 112 has as the two input groups connected thereto the fixed contents of the register 104, and the changing contents of a counter 114 which is cycled by output pulses from an oscillator 110. The binary counter 114 includes a sufficient number of stages such that it will pass through an output state corresponding to the highest channel number employed in the system. Accordingly, for the single counting cycle undergone by the counter 114, i.e., as it passes from an initial count state 00 . . . 0 to 11 . . . 1, it will pass through the BCD equivalent of the stored message during the count sequence. Accordingly, when this "match" condition obtains between the two comparator 112 inputs (and only then) an output match signal "M" will be generated.

Examining now a shift register 124, in accordance with one aspect of the present invention this shift register will contain one and only one binary 1 in one of its $n$ stages, the particular stage containing the 1 identifying which channel has been selected for viewing. To implement this, the Boolean variables M and CS discussed above, and OT (comprising the output of the shift register 124) are supplied to a combinatorial network 120 which executes a Boolean function $CS \cdot M + OT \cdot CS'$. Some reflection will show that a 1 is supplied to the input of the channel select storing shift register 124 during a channel select (CS) mode of operation only for the single counter 114 state corresponding to the contents of the register 104 when the match (M) signal is high (the first expression in the Boolean statement $CS \cdot M$). Thus one and only one 1 will be stored in the register 124, in a shift register stage dependent upon the contents of the register 104 — and thereby also corresponding to the channel selected for viewing by the subscriber.

The second Boolean expression $OT \cdot CS'$ is employed since the shift register 104 may be driven by a common clock with a channel authorization storing shift register 126 considered below. Thus, for channel authorization (CA) processing discussed below, the binary word stored in the register 124 simply recycles to resume and retain its original status in the register 124.

By the above operation, the channel select shift register 124 has a binary 1 in a particular one of its stages corresponding to a channel selected for viewing by a subscriber. However, the subscriber may or may not be authorized (and thus able) to receive the requested message. As a general matter, the FIG. 1 apparatus contains a channel authorization shift register 126 which has stored therein, pursuant to the commands issued by the system head end shown in FIG. 5, $n$-1's in its N stages, each of the 1's (and its relative position in the register 126) enabling reception of a particular program channel. Thus, the head end issues to all subscribers a series of messages to permit reception of the standard broadcast programs without request, and without any attendant premium fee. Correspondingly, the head end will permit reception of a premium program only after the subscriber has requested that program as by simply entering a channel selection request), the head end also generating a billing message upon effecting such authorization. A further "premium - TV" control key may be required if verification is desired for pay-TV billing purposes.

For the particular channel request operation discussed above, the binary 1 in the channel select register will reside in a stage of the shift register coupled to one input of a particular AND gate $128_{25}$ of any array 128. The other input to the AND gate $128_{25}$ is coupled to a particular stage of the channel authorization shift register 126 which controls viewing of the program on channel 25. There similarly exists plural additional gates $128_i$ for all other system channels.

Assume first that the subscriber has already been authorized reception of the program 25 (an appropriate 1 in the register 126), either because it is a standard broadcast channel or because the program has previously been requested by the subscriber. Under such conditions the AND gate 128 is fully enabled and the output high gate voltage passes to an input of a resistance network 136 (e.g., a ladder network; a summing network; or the like). The differing input excitations for the resistance network 136 each result in a particular and unique output voltage coupled to the control node of the voltage controlled oscillator 138, dependent upon which one (if any) of the gates 128 is enabled. For the assumed case, the gate $128_{25}$ generates a particular voltage which constrains the VCO 138 to provide precisely that local oscillation frequency which, when mixed with the ensemble of programs on the cable, translates program 25 into the frequency band of the IF amplifier 142 for delivery in a receivable spectrum allocation to the standard television receiver 144. Thus, the viewer is automatically provided at his receiver with the program which he requested with his hand-set keyboard 201, all operations occurring at electronic speed to provide no significant delay between the channel request and the provision of video.

Assume now that the channel "25" selected for viewing has not been authorized. Accordingly, the AND gate $128_{25}$ is not switched responsive to the 1 registered in the corresponding channel select shift register 124 stage. When this condition obtains, no enabling input is supplied to the resistance network 136 and no receivable video is generated by the heterodyne structure 138-140-142.

When the above conditions prevail, the outputs of all of the gates 128 are low, thus providing a high output at an OR-NOT gate 132. The output of the gate 132, together with the channel select mode signaling CS signal, switches an AND gate 134, the output of which essentially conveys the message that a channel has been selected but that its reception has not yet been enabled. This output message of the gate 134 is registered in a particular service request (SR) stage of the shift register 102.

Figure 2:
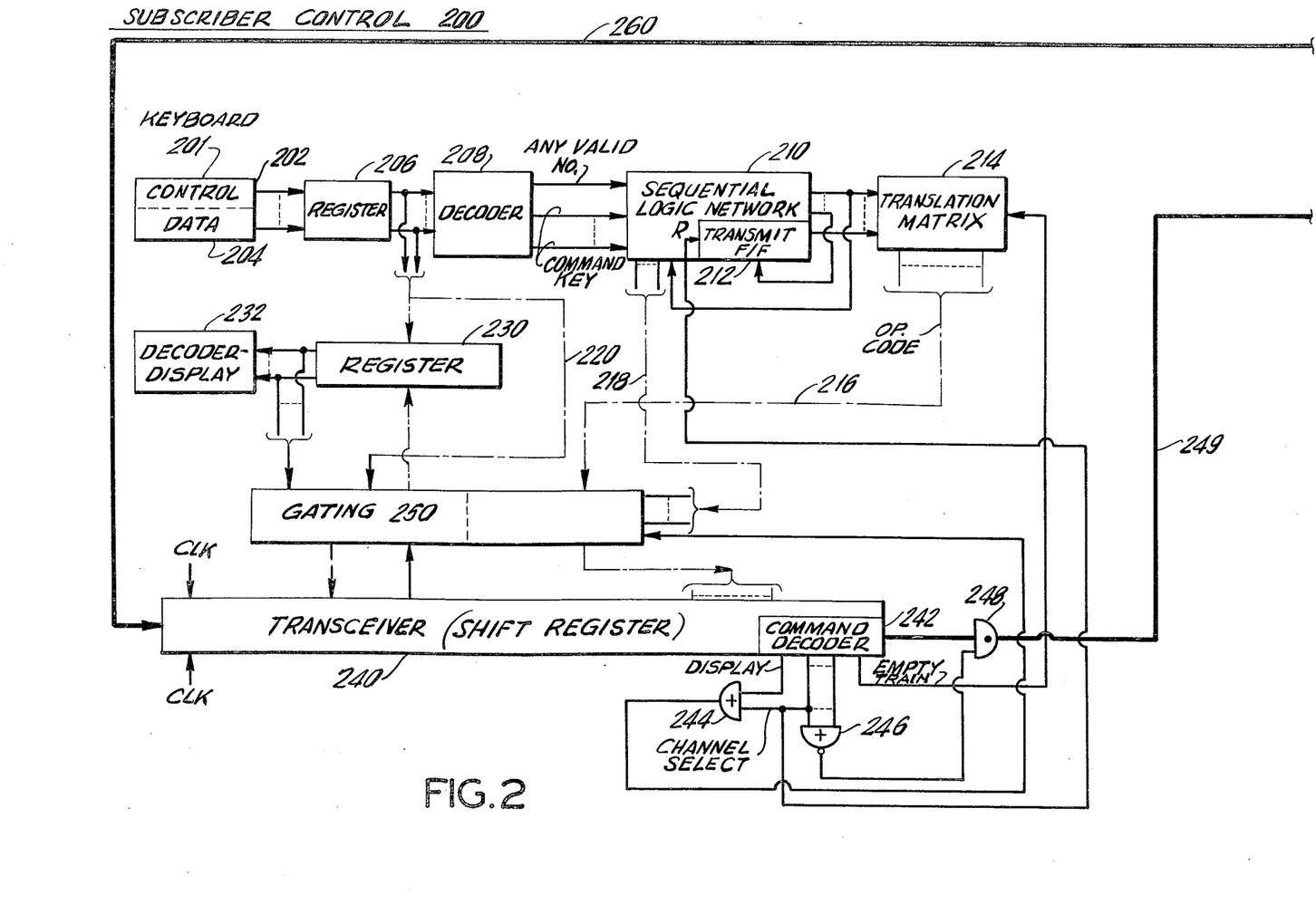
Figure 3:
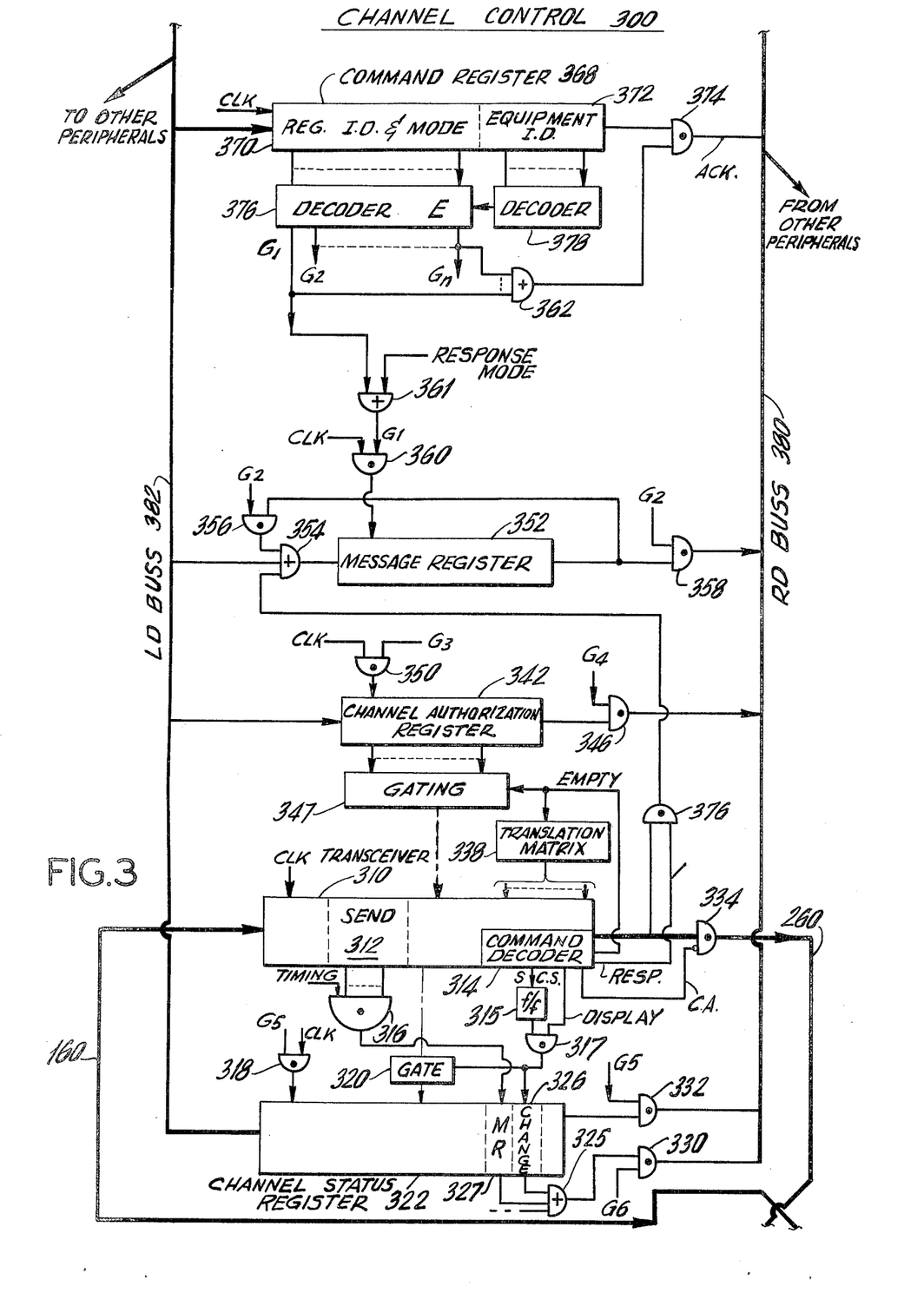

As above noted, all of the messages in the modules 100-300-200 circulate therebetween. As described below each message will circulate through all three modules, being quashed only after it returns through the complete circulation path 100-160-300-260-200-249 to its originating module. Accordingly, the channel select message in the transceiver 101, with the enabled SR flag bit, next moves to the channel control 300 transceiver 310 from which it is extracted and propagates to the head end by a procedure described below. A stored program controlled central processor 502 at the head end determines that the subscriber has requested a program for which he has not yet received authorization. Accordingly, the head end equipment under stored program control distributes a channel authorization message which permits the particular subscriber to receive the key-requested video, the computer program also generating billing information, as by printed form via an input output peripheral equipment item 507.

The channel authorization message propagates in digital form modulating a data subcarrier over the cable network 500; is received at the terminal control 400 at the subscriber location; is loaded into a channel authorization register 342 in the channel control module 300; shifts therefrom into the transceiver 310 in the module 300; thereafter passes in the manner above discussed to a transceiver 240 in the module 200 via the data link 260; and eventually moves into the desired transceiver 101 shift register 102 by way of lead 249.

The FIG. 1 apparatus loads the channel authorization shift register 126 with the channel authorization message stored in the shift register 102 in a manner analogous to that considered above for channel select operation. That is, the command decoder 106 notes the channel authorization operation code, and generates an enabled output CA signal. The CA signal passes through the OR gate 108 to load the register 104 which, in this case, is loaded with the channel number which is authorized for reception (e.g., "25"), and also a single authorization bit "A" which is of one binary value when the head end is enabling authorization, and of the other value when the head end is removing the power to watch a program. As before, the data portion of the contents of register 104, the comparator 112, and the counter 114 generate a match signal M which occurs at a time which identifies the data contents of register 104. The signals M, CA, A, and an additional Boolean variable OUT comprising the output of the shift register 126 are supplied as inputs to a combinatorial network 130. The network 130 supplies the data input of the shift register 126 with the Boolean function $CA \cdot M \cdot A + CA \cdot OUT \cdot M' + OUT \cdot CA'$ of the input variables. The first term of this expression loads (or clears) a particular shift register stage in accordance with the incoming authorization message; the second factor simply reloads the previously obtaining contents of the shift register during a channel authorization message as to channels having nothing to do with that message (the $M'$ variable component); and the final combinatorial function simply reloads the shift register contents in their entirety during a non-channel authorization message, e.g., during a channel select message.

The above discussion has thus shown the manner in which the channel selection and channel authorization functions are implemented, and the particular way in which reception of premium video signals are requested; effected; and accounted for as a business matter.

We note at this point several "housekeeping" electronic functions which obtain for the loop transmission between the modules 100-300-200. First, a system clocking timer 116 blocks an AND gate 118 in the loop path (i.e., connected to the output of the transceiver 101 shift register 102) at spaced periods of time. This results in an all zero operation code at such times, which is treated by the system as the operation code for a so-called "empty message" train. The other interconnected system modules 300 and 200 inspect the operation code stored in the operation code portion of the transceiver shift register therein for the incidence of such an empty train, which signals an appropriate time for such modules to load an outgoing message into the transceiver for propagation.

Moreover, the command decoder 106 in module 100 also produces an output signal when an empty train has propagated through the entire loop 100-160-300-260-200-249 to return to the shift register 102. The decoder 106 energizes a word generator 115 (in this case, simply a selected set of lines) which loads the operation code of a display message into the operation code storage portion of the shift register 102. As will become clear from the discussion below in conjunction with FIG. 2, the visual display at the subscriber control equipment will respond to a display train by presenting the data portion of the display message train (which corresponds to the channel being viewed).

Finally, as is a general system rule, the module 100, 200 or 300 which generates the message quashes that message. Thus, the command decoder 106 blocks message transmission (by disabling the gate 118) when it notes that a display message (which it necessarily produced) has come full circle to again reside in the shift register 102.

We consider now in more particular detail the subscriber control equipment module 200 shown in FIG. 2, i.e., the typically small keyboard-display structure given to a subscriber with which he enters commands and data. The discussion above has considered the character select control key of the key ensemble 201 followed by data keys 204 of the subscriber keyboard 201. The control key field may include as well other command or mode keys such as "response" (to transmit data to the system head end, possibly for purposes totally unrelated from video reception), a "send" key to indicate the end of a response message, and the like. The unit has a display 232, which may advantageously comprise a digital display of the contents of a register 230 decoded to conform to the particular display implementation as known to those skilled in the art.

To generate a message, e.g., the channel select message considered above, the subscriber depresses the character select key followed by appropriate data keys to identify the channel desired. Depression of each key generates plural data bits which are loaded into a register 206 the contents of which are operated upon by a decoder 208. Thus, responsive to each key depressed on the keyboard 201, one of a plurality of command key lines is energized (the particular one dependent upon the character selected). The decoder 208 energizes the upper output line if any numerical data key is depressed.

The output of the decoder 208 forms one group of inputs to a sequential logic network 210, which also receives as inputs the outputs thereof, and selected control signals from the command decoder portion 242 of the subscriber control module 200 transceiver 240. It is observed at this point that the construction of the transceivers 240 and 310 in the modules 200 and 300 parallel that of the transceiver 101 in the module 100. Briefly, the function of the sequential logic network is to control gating for the subscriber module 200, depending upon which mode the equipment has been operating in (i.e., which was the last depressed command key) and which key is currently being depressed to request new service, either by way of new command or new data.

After the character select key is depressed (it need not again be depressed — the system [i.e., the sequential network 210] remains in the character select mode independent of the number of channel changes made), the data key entered information (identifying the desired channel "25" in the above assumed example) is passed from the output of the key recording register 206 into the data portion of the transceiver 240 under control of gating 250 actuated by the sequence logic network 210. When the command decoder 242 next recognizes that an empty train operation code is contained in the transceiver 240, an appropriate enabling signal is supplied to a translation matrix 214 which converts a signal preserved in the sequential logic network 210 (indicating that the equipment is operating in the channel select mode) into a plural bit channel select operation code. This binary command passes via the gates 250 into the operation code portion of the transceiver 240. Thus, the transceiver 240 contains the channel select operation code and the number of the particular channel desired. This composite character select word then shifts from the shift register portion of transceiver 240 into the transceiver 101 of the channel select module 100 for execution in the manner above described.

When the character select message has come full circle to again reside in the transceiver 240, the character select operation code is detected by module 200 and employed for various purposes. First, it enables the gates 250 via an OR gate 244 to pass the data portion of the contents of transceiver 240 into a register 230 for display, such that the subscriber can see the identification of the channel being viewed. Since the data circulates at very rapid electronic speed, the display appears substantially coincident to the viewer with his depression of the keys. Then also, the message having come full circle, an OR-NOT gate 246 disables an AND gate 248 to quash the character select message. It will be observed also that a display command detected by the transceiver command decoder 242 similarly operates via the OR gate 244 to load the register 230 with the data contents of the transceiver 240. Thus, the display 232 is refreshed by display messages.

Turning now to the channel control module 300, it is the office of this module to extract appropriate messages circulating between the transceivers of the modules 100, 200 and 300 for transmission to head end equipment (such as television reception requests, response mode date, and the like) by loading such messages in a message register 352. It is the further function of the channel control module 300 to receive messages transmitted by the head end in an appropriate module 300 register; and at an appropriate time to load such messages into the transceiver 310 for circulation between the transceivers 310, 240 and 101.

Operation of the channel control module 300 proceeds under control of a command register 368 which receives messages transmitted from the head end via the subscriber terminal control unit 400 considered below. The incoming message loaded into the register 368 includes two portions, a register and operational mode identifying portion 370, and an equipment identifying portion 372. The equipment identifying message component in register 368 determines whether or not the message stored in the composite register 368 is for the composite equipment controlled by the structure of FIGS. 1, 2 and 3 — it being clear that any subscriber location may include additional equipment items communicating with the head end via data loading and reading busses 382 and 380. Such other peripherals may comprise, for example, security equipment, consumption registers (gas or electric meters, or the like) for remote reading; printers, readers or the like.

A decoder 378 responds to the equipment identifying contents of the register 368 and, assuming that the decoder confirms that the message is indeed intended for the apparatus of FIGS. 1–3, provides an enabling signal for loading a decoder 376 with the information contained in the mode and register data portion 370 of the register 368. The output of the decoder 376 is an enabling one or more of a signal ensemble $G_1-G_n$ which control the operational mode of plural registers contained in the channel control module 300. Assume first that in incoming digital word from the head end is a channel authorization message. The decoder 376 will provide a high $G_3$ output which supplies data clocking pulses to a channel authorization shift register 342 by enabling a gate 350. The channel authorization message would then pass into the enabled register 342 from the head end, cable 500, and terminal control unit 400 down a load data bus 382 into the register 342. Sometime later, when the command decoder portion 314 of the transceiver 310 notes an empty train in the transceiver, a command decoder signal passes the channel authorization message from the register 342 through enabled gating 347 into the data portion of the transceiver 310. A translation matrix 338 also responds to the decoded empty train signal for loading the prescribed channel authorization operation code into the portion of the transceiver shift register therefor. The channel authorization message loaded into the transceiver 310 then simply circulates into the transceiver 240 and, therefrom, into the transceiver 101 for execution in the manner above described.

The message register 352 included in the channel control module 300 is employed to temporarily store outgoing (i.e., "response") messages generated by the subscriber at the keyboard 201 until the register is interrogated for reading and transmission to the head end. To this end, an AND gate 376 is partially enabled by a response mode decoded output from the command decoder 314 and enters the resulting following response message present at the output of the receiver 310 into the message receiver 310 via an OR gate 354, the requisite clocking for the shift register 352 during such loading being provided by an OR gate 361 and an enabled ($G_1$) AND gate 360.

When the head end desires to interrogate the register 352, it issues a command which generates high $G_1$ and $G_2$ signals (at the output of decoder 376) which provide shift clocking for the message register 352 ($G_1$ enabling gate 360) as well as operatively actuating an output gate 358 for connecting the outgoing message to the read data bus 380. An additional AND gate 356 is actuated by the $G_2$ control signal such that the data also recirculates and is reloaded into the message register 352 by way of the gates 356 and 354. Accordingly, the transmitted message is again retained in the message register 352 after output reading. This makes the message available in case some error occurs during transmission. It is also observed that the register 352 may be directly loaded by the head end via the load data bus 382 and the OR gate 354 for testing purposes.

Then also, an OR gate 362 is employed to actuate an output AND gate 374 for output clocking of the command word contained in register 368 when any of the outputs $G_1 - G_n$ is high, i.e., when any command was addressed to the channel control unit 300. This results in the retransmission of the received command word to the head end, providing verification that the message was received and accurately.

The channel control module 300 further includes a channel status register 322 which contains information descriptive of the status of the composite subscriber terminal. In particular, a channel changing preserving digit 326 of the status register 322 is set whenever the subscriber changes channels, i.e., activates his keyboard 201 to request a channel different from that which has been viewed before. This is done by setting a flip-flop 315 when a subscriber generated channel select message cycles through the transceiver 310, and setting a flag bit in the change register 326 when the following display train is loaded in the transceiver 310 via a fully enabled AND gate 317. It is observed that the output of the gate 317 also enables a gate 320 to pass the channel identifying data portion of the contents of the transceiver 310 into the data storing portion 324 of the status register 322. It is also observed that an AND gate 316 examines the transceiver 310 for the incidence of the "send" operation code in the register which signifies that a response mode message to be transmitted from the subscriber station to the head end has been completed. Upon noting the send character at a proper system time interval, the gate 316 sets a bit in a message ready stage 327 of the composite register 322.

Loaded registers 326 or 327 thus signify, in summary fashion, that the channel control module 300 contains information which should be communicated to the head end for action. Any one of the enabled flag bits will switch an OR gate 325 which is interrogatable by the head end issuing a command to open AND gate 330 by providing a $G_6$ enabling signal in the manner above discussed.

Figure 4:
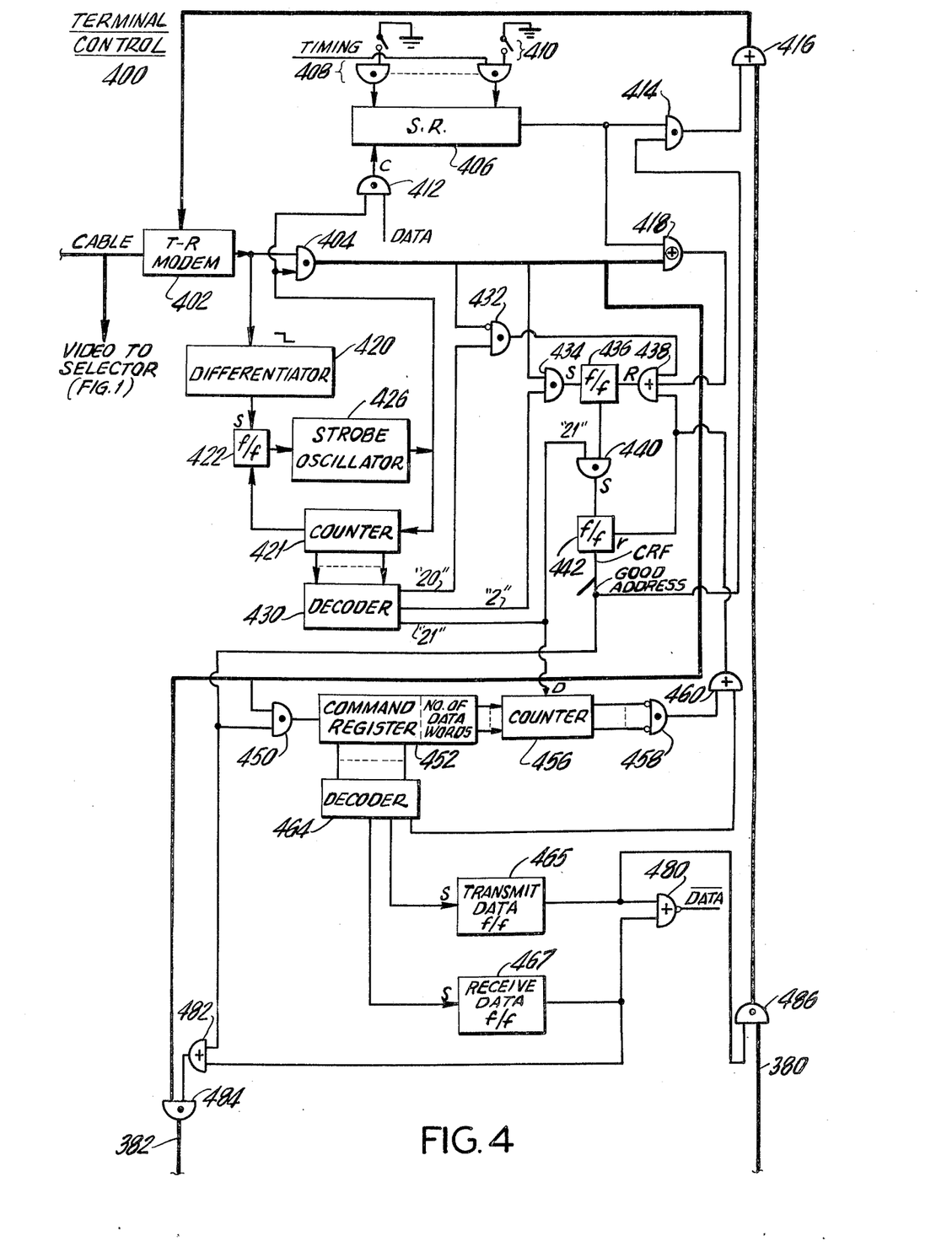

Turning now to the terminal control unit 400 of FIG. 4, there is included supervisory apparatus for implementing the bilateral cable signaling, and for determining when the particular subscriber station including the FIG. 4 apparatus is being addressed by a digital message on the cable 500 (which, of course, is essentially simultaneously received at all subscriber locations). The digital message generated by the head end equipment modem 504 comprises a binary sequence of any prescribed format and modulation scheme well known to those skilled in the art. For purposes of concreteness, it is assumed here that the message pattern consists of digital word groups beginning with an address to identify a particular subscriber location which is to respond to the following message. The address format is taken to be a leading binary zero which follows a quiescent 1 rest position for the digital signaling path, a binary 1 in the second message bit position, 17 information address bits (capable of selecting one-of-$2^{17}$ subscribers) and terminating in a binary 1 in the 20th bit position (a stop bit). The address word is then followed by a command word which signifies the mode of operation desired, possibly followed thereafter by one or more data words (propagating in either direction) dependent upon the particular mode of operation desired for the composite signaling system.

Examining first system processing for the initial or address word, that portion of the signal spectrum on the cable 500 bearing the modulated digital subcarrier is isolated and demodulated by a transmit-receive modem 402. The modem 402, of course, is adapted to effect essentially the inverse of the modulation operations effected by the modem 504. Such signaling again may be of any modulation-demodulation format well known to those skilled in to the art, FSK being one preferable form.

The 20-bit address word in the output of the modem 402 will typically exist in nonreturn-to-zero form to reduce bandwidth, and thus must be strobed in a gate 404 to present at the output thereof a 20 bit binary word. To this end, the 1 -to- 0 voltage transition at the beginning of the incoming word is detected by a voltage transition detector (differentiator) 420 which sets a flip-flop 422. The set flip-flop 422 enables a strobe oscillator 426 which generates a fixed number of strobe pulses for strobing the nonreturn-to-zero output of modem 402 about the center of the bit times, employing as an instrumentality the AND gate 404. A counter 421 counts the strobe pulses and resets the flip-flop 422 after the proper number of pulses have been generated. Further, a decoder 430 is connected to the counter 428 to provide output indications of particular bit times for control purposes as appears below.

By way of general overview, a shift register 406 is preset with the particular address of the terminal shown in FIG. 4, and this address clocked out in series to an Exclusive OR gate 418. The contents of the register are then compared with the incoming message present at the output of the gate 404. Thus, assuming that the address of the message transmitted by the head end corresponds to that initially contained in the shift register 406, there will be no output of the Exclusive OR gate 418 during the entire addressing message. A flip-flop 436 is provisionally set at the beginning of each addressing message, but will be reset should any single bit of the address not be the same as that loaded into the shift register 406, i.e., if there is any output of the Exclusive OR gate 418 which would then reset the flip-flop via an OR gate 438. The output of the flip-flop 436 is examined after the 20 bit address message ends, i.e., as during a pseudo 21st bit time, and assuming the Q flip-flop output to be a 1, sets a command ready flip-flop 442 to signify that the following command is indeed intended for the particular terminal of FIG. 4.

The particular station address is determined by the pattern of 1's and 0's entered into the inputs to gates 408 by the pattern of opens and closures of switches 410, assuming current sinking (e.g., DTL, TTL or the like) logic gates 408 are used. This address pattern is loaded via preset inputs into the shift register 306 before the cable is to be examined for command messages by any appropriate system timing signal. It is observed also that the strobe signals generated by the strobe oscillator 426 serve as clocking signals for the shift register 406, these signals passing through a gate 412 when the FIG. 4 equipment is examining the cable 500 for an address (i.e., when the terminal is not in a data input/output mode).

By way of more detailed discussion of the above address decoding functioning, the flip-flop 436 is provisionally set at the beginning of a message by an AND gate 434 if, during the second bit time (as determined by the appropriate output of decoder 430) the requisite binary 1 is present in the incoming (addressing) binary word. Thus, the flip-flop will be set during the second bit position only if the requisite 1 is present at the output of the gate 404. Similarly, a gate 434 examines the incoming command word for the requisite 1 stop bit in the 20th position. If the 20th bit is a zero, the AND gate 432 (with an inverting input terminal connected to the gate 404) is switched and resets the flip-flop via the gate 438. Similarly, the flip-flop 438 may be reset if other conditions are not met. Thus, for example, the command message at the output of the gate 404 may contain parity bit or bits and the flip-flop 436 reset via the gate 438 if parity does not verify.

Thus, if the head end transmitted address is not destined for the terminal control module 400 of FIG. 4, the command reception flip-flop 442 is not set at the conclusion of the addressing message, and the succeeding command and data words are disregarded. However, assuming that the address corresponds to that of the module 400 the flip-flop 442 is set. The CRF signal then present at the ouput of the flip-flop 442 enables gates 450 and 482. The following word, corresponding to a command to be executed either by the modules of FIGS. 1–4, or some other peripheral attached to the data busses 382 or 380 must then respond in a mode specified by the following command message. This command message passes via the modem 402 and gate 404 through the enabled gate 484 to the load data bus 382 for execution in accordance with its particular purport in the manner discussed above.

It is also observed that the command passes via the enabled gate 450 into a command register 452. The condition may obtain where the command identifies a plurality of data words to be forthccoming, and a particular field of the register 452 presets a down counter 456 with the number of such data fields. A decoder 464 connected to the command register 452 characterizes the command as being one whereby data is to be transmitted from the subscriber station towards the head end (in which case the decoder 464 sets a data transmit flip-flop 465), or whereby data is to be received by the subscriber from the head end (in which case the decoder 464 sets a receive-enabling flip-flop 467). Depending upon whether the terminal is operating in a data receiving or transmitting mode, one of the gates 484 or 486 will be conditioned by the output of a corresponding one of the flip-flops 465 or 467 to enable the appropriate one of the data busses 380 or 382. Also, the outputs of the flip-flops 465 and 467 pass through an OR NOT gate 480 to signal (DATA′) when the system is not operating in a data mode for purposes of controlling the gate 412 above considered.

Figure 5:
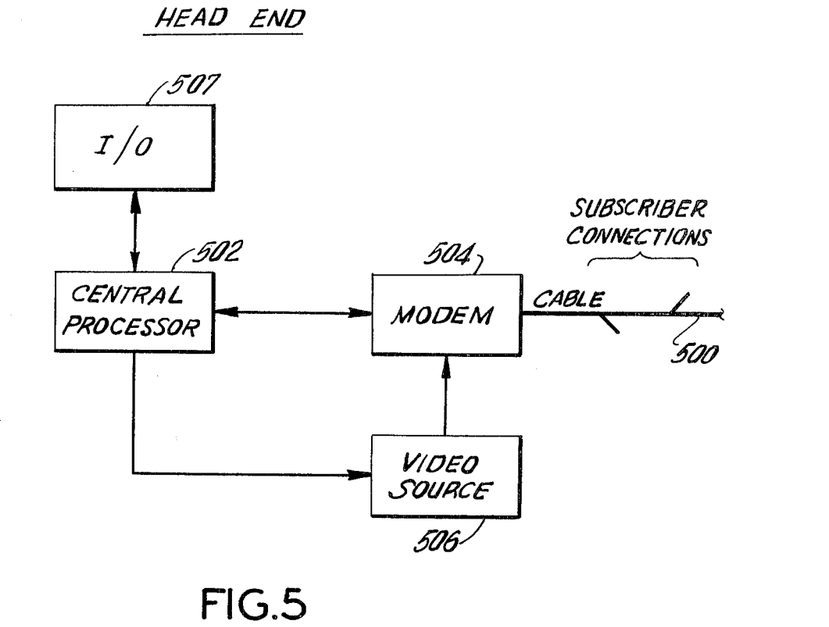
Figure 6:
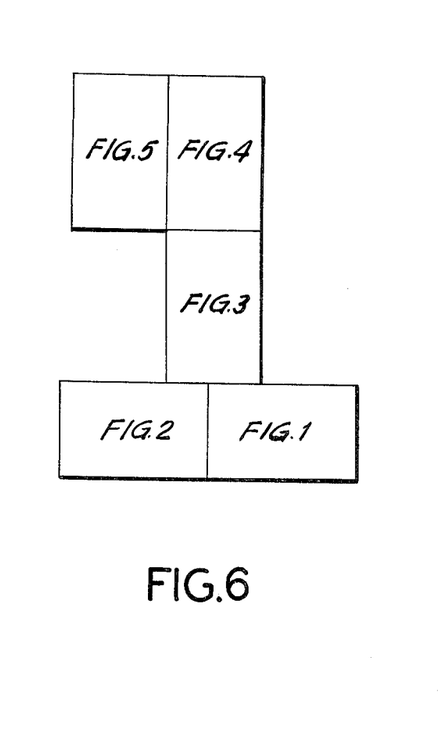

Data read from a register in one of the subscriber station channel control modules 300 via the read data bus 380 through the enabled terminal control modem AND gate 486 and an OR gate 416 flows to the modem 402 for modulation and transmission via the cable 500 to the head end modem 504. It is there demodulated, and passed to the central processor 502 for appropriate action, and/or passage to an input/output unit 507.

At the end of each data word received by the FIG. 4 terminal control module as signaled by system timing or an appropriate output of the decoder 430, the counter 456 is decremented by one. When its output reaches zero (as determined, for example, by a NOT AND gate 4380 signifying that all the data has been received or transmitted, the output of the gate 458 acts through OR gates 430 and 438 to reset the flip-flop 436 such that the composite equipment returns to its quiescent state examining the cable 500 for its address.

The head end equipment has been considered above with respect to its salient data communication functions. To breifly reiterate, the head end equipment includes a central processor unit 502 which may embody any common stored program computer organization with an appropriate control program therein. The output words generated by the processor are coupled to the modem 504 for modulation and transmission on the cable, and incoming messages are demodulated by the modem 504 and supplied to the central processor 502. The processor generates appropriate output records via the input/output unit 507, for example, billing messages or billing accumulation messages responsive to premium program selections by system subscribers. The CPU 502 and input/output unit 507 operate upon incoming response data messages in any manner desired appropriate to the significance of such messages.

The digital messages issued and received by the modem 504 modulate carriers within the frequency spectrum capacity of the cable 500, at frequency allocations distinct from those occupied by video program. A video source 506 supplies the plural commercial and premium video signals which propagate on the cable 500 at frequency allocations above discussed. The video source 506 may supply video already at its desired RF spectra to the cable 500 via a linear combination with the modulated digital information, or such radio frequency modulation may be one of the offices implemented by the modem 504 in which case the video source 506 may supply video at base band or intermediate frequency.

The above described arrangement has thus been shown to provide commercial and premium video programming on a subscriber demand basis with full accountability for each premium program viewed. The apparatus also provides for reverse transmission of information from subscriber locations to the head end for purposes which may be commercial or noncommercial, or which may or may not relate to video purposes.

The above described arrangement is merely illustrative of the principles of the present invention. Numerous modifications and adaptations thereof will become readily apparent to those skilled in the art without departing from the spirit and scope of the present invention.

What is claimed is:

1. In combination, subscriber terminal means for selectively displaying one of plural video programs supplied thereto, each of the plural video programs occupying a differing, prescribed frequency allocation, a plural stage channel select shift register, means for loading a selected stage of said shift register with a predetermined binary character, for selecting a particular one of said plural video programs for viewing, a plural stage channel suthorization shift register, means for loading said channel authorization shift register to enable reception of selected of said plural video programs, plural coincidence logic means each connected to a differing, associated pair of the outputs of one of said channel select shift register stages and one of said channel authorization shift register stages, and video selection means responsive to the outputs of said coincidence logic means for selectively enabling reception of a particular one of the plural video programs wherein said subscriber terminal means includes channel selector, channel control, and subscriber control modules, each of said modules including a data transceiver, data bus interconnecting means for serially-loop connecting the transceivers in each of said channel control, subscriber control and channel selector modules, each of said modules including means for loading digital messages into the transceiver there contained and means for extracting messages therefrom, and means for serially propagating messages around the digital transmission loop comprising said module transceivers and 2. A combination as in claim 1 wherein said video reception enabling means comprises a passive network having plural inputs connected to the outputs of said coincidence logic means, and a voltage controlled oscillator connected to the output of said passive network, said network including means for supplying differing control voltage to said voltage controlled oscillator dependent upon the input energization thereto from said coincidence logic means.

3. A combination as in claim 2 wherein said video reception enabling means further comprises a mixer connected to the outuput of said voltage controlled oscillator, and a band pass filter connected to the output of said mixer.

4. A combination as in claim 3 further comprising a standard television receiver connected to the output of said band pass filter.

5. A combination as in claim 1 wherein said subscriber control module includes means for entering into said module transceiver a channel select message comprising a channel selection operation code and a data field identifying the channel selected.

6. A combination as in claim 5 wherein said channel selector module further comprises a register, a command decoder connected to said channel selector transceiver, said command decoder including means responsive to said channel select operation code residing in said transceiver for loading said register with said channel identifying data field, and means for loading said channel select shift register dependent upon the contents of said register.

7. A combination as in claim 5 wherein said channel select shift register loading means comprises a pulse source, a binary counter cycled by said pulse source, a digital comparator for comparing the contents of said counter and said register, and combinatorial logic means for supplying a binary output signal of said predetermined binary value to said channel select shift register when said comparator signals match between the contents of said register and said counter.

8. A combination as in claim 7 wherein said combinatorial logic means further comprises means for selectively recirculating data in said channel select shift register.

9. A combination as in claim 1 wherein each of said channel selector, channel control and subscriber control modules further comprises means for inhibiting recirculation of a message previously generated by that module, said recirculation inhibiting means including command decoding means connected to said module transceiver.

10. A combination as in claim 1 wherein said subscriber control module comprises manually operable command and data entering means, subscriber register and decoding means loaded responsive to each actuation of said subscriber command and data entering means, gating means for selectively connecting said subscriber register and said subscriber control transceiver, and sequential logic means for selectively actuating said gating means responsive to the output of said subscriber register and decoding means.

11. A combination as in claim 10 wherein said subscriber control and data entering means comprises keyboard means including a control key field and a data key field.

12. A combination as in claim 10 wherein said subscriber control module comprises display means for displaying the video channel selected for viewing, display register means for controlling said display means, and means for selectively loading said display register means with the contents of said subscriber control module transceiver.

13. A combination as in claim 12 wherein one of said terminal modules includes means for loading the transceiver there located with a display train message operation code, and wherein said subscriber control module includes means responsive to said display train operation code residing in said subscriber control module tranceiver for loading said display register with contents of said transceiver.

14. A combination as in claim 1 wherein one of said terminal modules includes means for loading the associated transceiver with an empty train message operation code, and wherein said terminal modules include command decoding means responsive to said empty train operation code message residing in the module transceiver for enabling message loading into said transceiver.

15. A combination as in claim 1 wherein said channel control modules includes a channel authorization register selectively loaded with a channel authorization message comprising a channel authorization operation code, a channel identification number and an authorization characterizing field, means for selectively loading said transceiver of said channel control module with the channel authorization message contained in said channel authorization register, and means included in said channel selector module for selectively loading a particular stage of said channel authorization shift register in accordance with said channel authorization message after said message has translated to said transceiver in said channel selector module.

16. A combination as in claim 15 wherein said channel authorization shift register loading means and said channel select shift register loading means comprises a register, command decoding means responsive to particular operation codes in said channel selector module transceiver for loading said register with a channel identification field stored in said transceiver, a counter, pulse source means for cycling said counter, a digital comparator having inputs connected to each of said register and said counter, and first and second logic means for respectively loading said channel select shift register and said channel authorization shift register depending upon the output of said comparator.

17. A combination as in claim 16 wherein said channel selector module register further comprises means for storing the authorization characterizing field of said channel authorization message, and wherein said second logic means further comprises means responsive to said stored authorization field for selectively energizing said channel authorization shift register.

18. A combination as in claim 17 wherein each of said first and second logic means further comprises means for recirculating the data contained in said associated shift register.

19. A combination as in claim 1 wherein said subscriber control module comprises means for entering into said transceiver there contained a response mode outgoing message comprising a response mode signaling operation code and a data field, wherein said channel control module further comprises a message register, and further comprising means responsive to a response mode message in said channel control module transceiver for loading said message register from said channel control module transceiver.

20. A combination as in claim 19 wherein said channel control module further comprises a channel status register, said status register including plural, independently presettable stages for selectively signaling when said subscriber terminal means requires servicing, disjunctive logic means having plural inputs connected to the outputs of said presettable status register stages, and means responsive to the contents of said channel control module transceiver for selectively presetting said presettable channel status register stages.

21. A combination as in claim 1 wherein said channel control module includes a command register and plural additional register, and decoder means connectecd to said command register for selectively enabling said other channel control registers.

22. A combination as in claim 1 wherein said subscriber terminal means further comprises terminal control means comprising modem means for providing bilateral digital signaling, means for selectively coupling digital words received by said modem to said channel control module, and address decoding means responsive to an incoming digital address supplied by said modem means for selectively enabling said selective coupling means.

23. A combination as in claim 22 wherein said address decoding means comprises an address shift register, means for presetting said address shift register with a particular terminal address, means for shifting said address out of said shift register in time coincidence with an incoming address message and Exclusive OR logic means having inputs connected to the output of said address shift register and said modem means.

24. A combination as in claim 23 wherein said address decoding means further comprises a flip-flop, means for presetting said flip-flop at the beginning of an address message, and means for resetting said flip-flop, said resetting means having an input connected ot the output of said Exclusive OR logic means.

25. A combination as in claim 24 wherein an addressing message has prescribed digit values at prescribed time slots therein, said address decoding means further comprising coincidence means enabled during said predetermined time slot periods for resetting said flip-flop if the proper message character is not then present.

26. A combination as in claim 22 wherein said terminal control means further comprises a command register and means responsive to said terminal control means having determined a proper address for enabling data flow between the output of said modem means and said command register.

27. A combination as in claim 26 further comprising data mode decoder means connected to said command register, transmit and receive mode flip-flops selectively set by the outputs of said data mode decoder means, and data receiving and transmitting gate means respectively enabled by the output states of said transmit and receive mode flip-flops.

28. A combination as in claim 1 further comprising cable means connected to said terminal means, head end means connected to said cable, said head end comprising a stored program central processor, input-output means connected to said processor, a modem connecting said processor with said cable, and head end means for supplying plural video programs to said cable.

29. In combination in a two-way CATV system, a cable, head end mens connected to the cable for supplying thereto plural video programs and serial data, at least one subscriber terminal connected to said cable, said subscriber terminal including modem means for bilateral digital signaling with said head end via said cable, plural transceivers, means for circulating messages between said transceivers, first register means for storing digital messages transmitted to said subscriber terminal from said head end, gating means for loading a selected one of said transceivers from said first register means, seecond register means for receiving information from one of said transceivers distinct from said transceiver selectively loaded by said first register means, subscriber channel request means for entering a requested video program channel, and video program converter means responsive to a subscriber requested channel and to a message transmitted by said head end for operatively enabling reception of the requested program.

* * * * *

UNITED STATES PATENT OFFICE
CERTIFICATE OF CORRECTION

Patent No. 3,934,079            Dated   January 20, 1976

Inventor(s)   ANDREW WAYNE BARNHART

It is certified that error appears in the above-identified patent and that said Letters Patent are hereby corrected as shown below:

Claim 1 line 16, change "suthorization" to -- authorization --;

line 37, after "and", insert -- said transceiver interconnecting means.;

Claim 7 line 1, change "5" to -- 6 --;

Claim 29 line 2, change "mens" to -- means --;

Signed and Sealed this

Seventeenth Day of August 1976

[SEAL]

Attest:

RUTH C. MASON
*Attesting Officer*

C. MARSHALL DANN
*Commissioner of Patents and Trademarks*